July 23, 1929.                N. E. WAHLBERG                1,721,721
                   BRAKE MECHANISM FOR STEERING WHEELS
                   Filed June 25, 1924        4 Sheets-Sheet 1

Witness:                              Inventor,
                                      Nils Erik Wahlberg,
                                      By Offield Wahlberg Scott & Poole
                                                              Attys July 23, 1929.                N. E. WAHLBERG                1,721,721
                    BRAKE MECHANISM FOR STEERING WHEELS
                    Filed June 25, 1924      4 Sheets-Sheet 3

*Fig. 3*

Witness:
Chas. T. Koursh

Inventor,
Nils Erik Wahlberg
By Offield Nehlhope Scott & Poole
Attys.

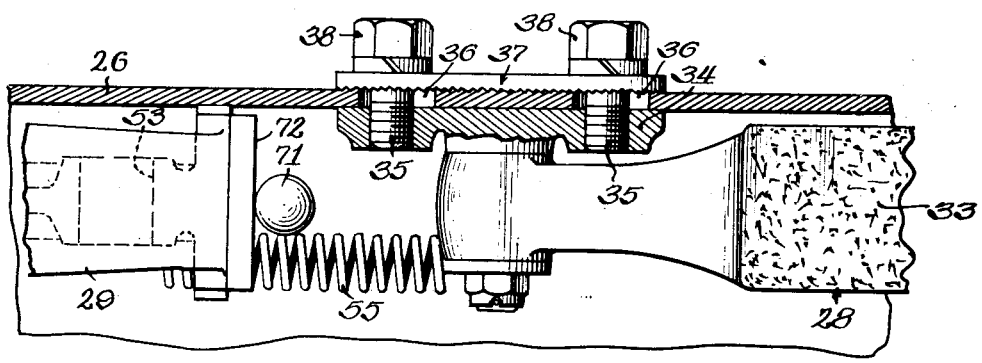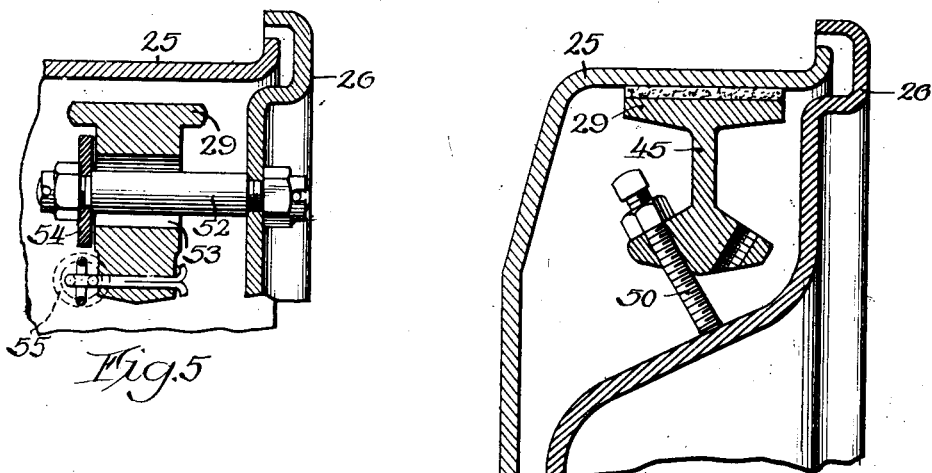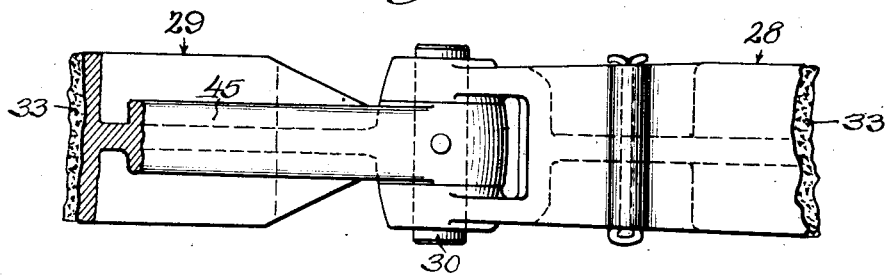

Patented July 23, 1929.

1,721,721

UNITED STATES PATENT OFFICE.

NILS ERIK WAHLBERG, OF KENOSHA, WISCONSIN, ASSIGNOR TO NASH MOTORS COMPANY, OF KENOSHA, WISCONSIN, A CORPORATION OF MARYLAND.

BRAKE MECHANISM FOR STEERING WHEELS.

Application filed June 25, 1924. Serial No. 722,218.

This invention relates to brake mechanism for motor vehicles and particularly to brakes for wheels which are pivotally supported upon a motor vehicle axle so that they may be used for steering the vehicle.

The principle object of the invention is to provide a simple and durable construction wherein the operation of the brake will be unaffected by the pivotal steering movements of the wheel. Other objects of invention will appear from time to time as the description proceeds.

The invention may best be understood by referring to the accompanying drawings in which:

Figure 3 is a section taken on line 3—3 of Figure 2 with axle pivot parts omitted.

Figure 4 is an enlarged cross section taken on line 4—4 of Figure 3.

Figure 5 is a cross section taken on line 5—5 of Figure 3.

Figure 6 is a cross section taken on line 6—6 of Figure 3.

Figure 7 is a cross section taken on line 7—7 of Figure 3.

Figure 1:
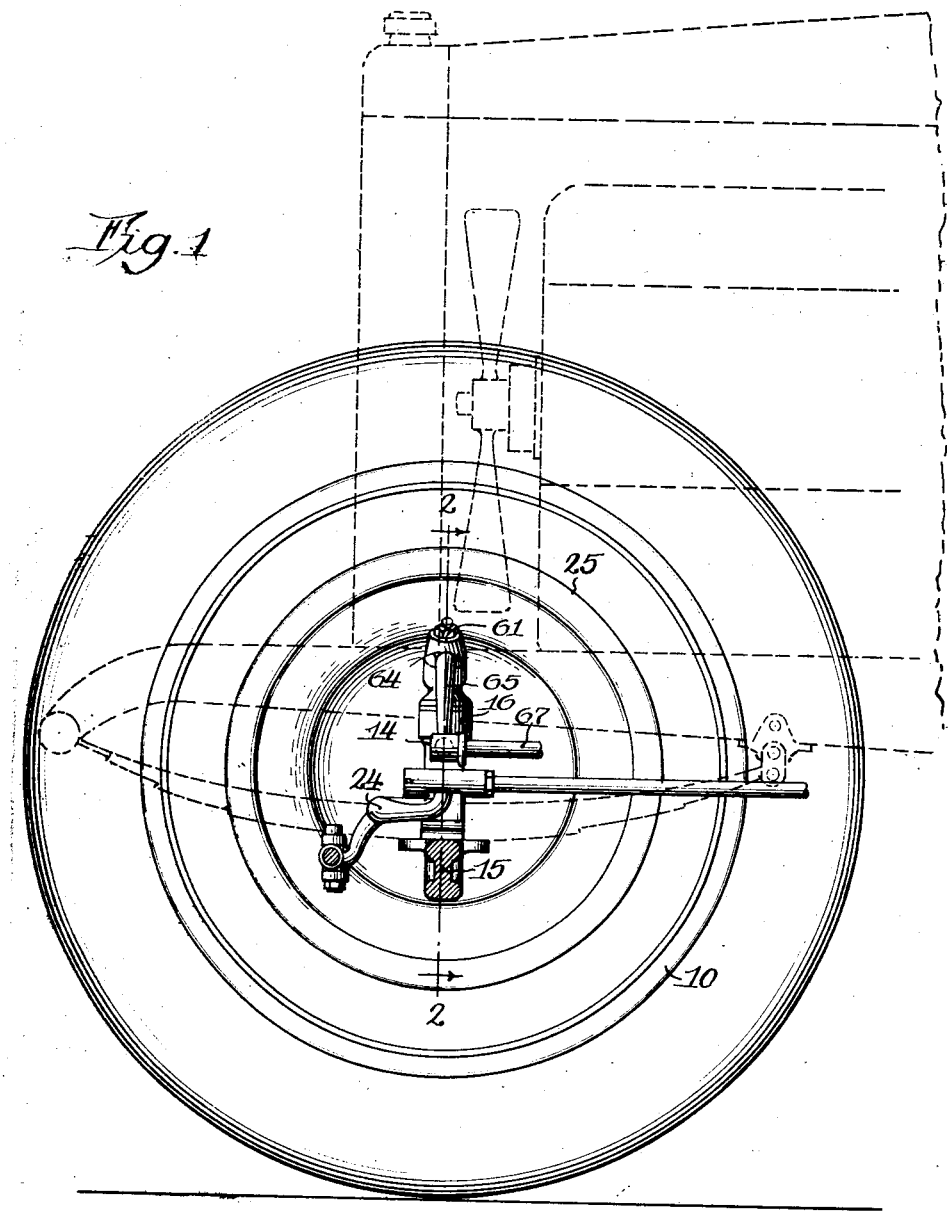
Figure 1 is a fragmentary view of an automobile taken in vertical section through the front axle, and showing the application thereto of one form of braking mechanism in which my invention may be embodied.

Referring now to the details shown in the drawings 10 indicates generally a wheel, herein shown of the disc metal type having a hub 11 mounted on a spindle 12, and movable about a vertically disposed pivot pin 13 extending through pivot bearing 14 of the vehicle axle 15, and upper and lower knuckle arms 16 and 17, respectively carried by the wheel spindle 12. As shown herein, said pivot pin is fixed against rotation relative to the axle by a transverse locking pin 20. Suitable bearing sleeves 21 and 22 are carried by the arms 16 and 17 for bearing on said pivot pin, and a thrust bearing indicated generally at 23 is interposed between said lower arm and the axle bearing 14. The axle is steered through steering arm 24 secured to the spindle in the usual manner.

Mounted on the wheel 10 is a brake drum 25, and spaced laterally therefrom is a cover plate 26 fixed to the axle spindle by bolts 27, and forming an enclosure for the brake band.

The brake band shown herein comprises two parts 28, 29 hinged together at their lower ends by a pin 30, and each having friction members 33 of the usual form adapted for engagement with the brake drum. The brake band is supported with respect to the wheel axle by suitable means herein including an adjustable connecting bracket 34 pivotally connected to the extremity of one of the brake shoe members 28 as shown in detail in Figure 4. This connecting bracket forms a fixed fulcrum for the band, and is secured to the cover plate 26 by a pair of bolts 35, 35 threaded in said bracket and extending through slots 36, 36 in the cover plate and carried by a corrugated plate 37, engaging the exterior of the cover plate. The heads 38, 38 of bolts 35, 35 are thus in position to be turned and the plate 37 shifted longitudinally to adjust the position of the fixed end of said brake band as required.

Means providing a floating support for the brake band comprises a plurality of tension plates 39, 39 each adapted to have sliding engagement with flanges 40, 40 carried by the cover plate and arranged to maintain the brake band members in proper position relative to the brake drum. As shown herein, two tension plates and associated flanges are shown, each secured adjacent the periphery of one of the brake band members, by bolts 41 and maintained under tension by a coil spring 42 surrounding a guiding pin 43 passing through said tension plate and threaded in the web or flanges 44 and 45 of the respective brake bands 28 and 29.

Means are provided for limiting the inward radial movement of the brake band members, comprising a plurality of set screws 50, 50 extending through the flanges 44 and 45 of the brake band flanges and inclined outwardly into engagement with the cover plate 26 as shown in detail in Figure 6.

The outer or free end of the brake band member 29 is supported by a pin 52 mounted on the cover plate 26 and extending inwardly through an enlarged aperture 53 in the end of said band member. A washer 54 is secured at the inner end of said pin and frictionally engages the inner side of the brake band, as shown in detail in Figure 5. The fixed end of brake member 28 and opposite free end of brake member 29 are connected by tension spring 55. A tangential spring 56 is also provided between the lower end of member 28, adjacent its pivotal connection 30, and a flanged projection 57 carried on the cover plate 26.

Figure 2:
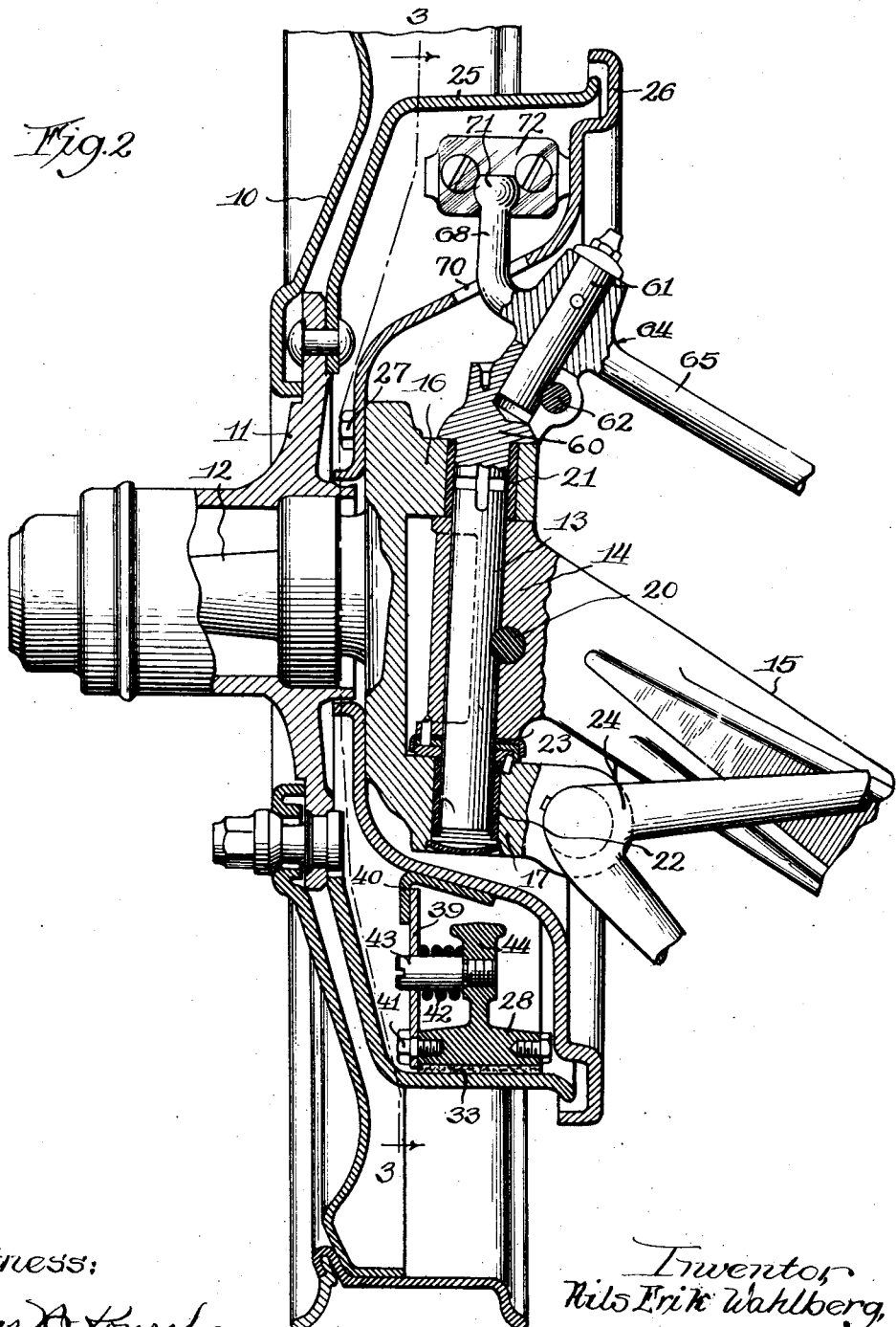
Figure 2 is an enlarged vertical cross section taken on irregular line 2—2 of Figure 1.
Figure 3:
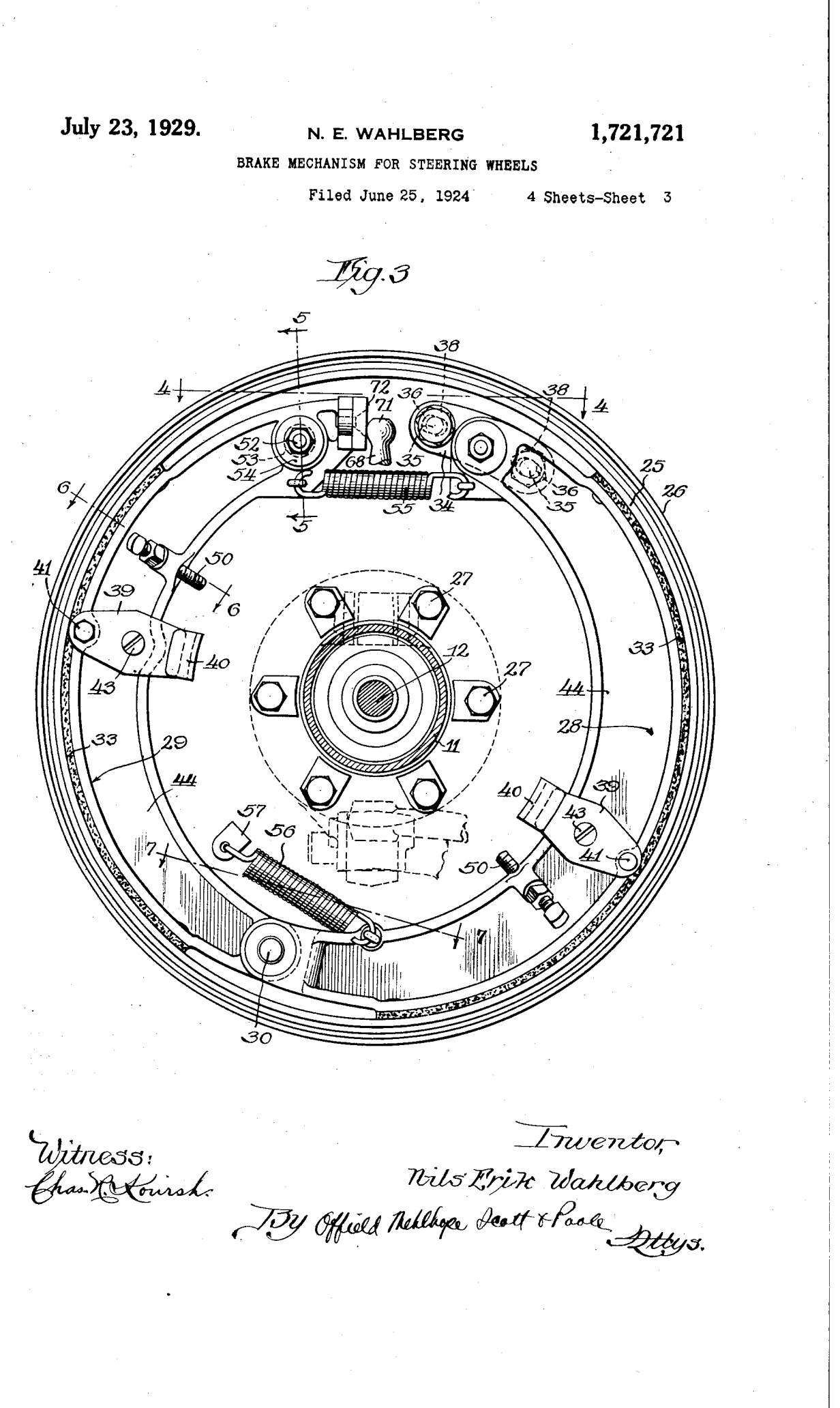

Referring now more particularly to the improved means of actuating the brake mechanism above described, it will be observed in Figs. 1 and 2 that the upper end 60 of the pivot pin 13, which is rigid with the main axle as before described, extends above the upper bearing arm 16 of the wheel axle and is provided with a bearing pin 61, locked thereto by a cross pin 62, and inclined outwardly or away from the wheel. Pivoted on this bearing pin is an operating lever 64, having a relatively long arm 65 extending outwardly and downwardly above the main axle 15 and is engaged with a rod 67 having operative connection with the brake operating mechanism of the vehicle in any approved manner. The inner lever arm 68 of the operating lever 64 extends through an aperture 70 in the cover plate 26, and is turned upwardly to terminate in a ball or knob 71. This ball or knob 71 is so arranged that its vertical axis is adapted to coincide substantially with the vertical axis of the pivot pin 13, when said lever arm is moved into actuating engagement with the adjacent bearing surface 72 formed at the end of the free brake member 29, as clearly shown in Figures 2, 3 and 4. With the brake in engaged position relative to the brake drum as shown, it will be obvious that if the wheel spindle is swung pivotally on the pivot pin axis for steering in either direction, the ball 71 will move along the bearing surface 72 of the brake but its tension thereon will be unaffected by such movement, since the axis of the ball coincides substantially with the axis of the pivot pin. The brake is released by releasing the pressure of lever arm 64 and ball 71 on the brake end. The movement of the brake members is preferably limited by the adjusting devices heretofore described, so that said ball is normally maintained in engagement with the bearing surface of said brake, but at reduced pressure so that the brake is fully released from frictional engagement with the drum. There are intermediate points, of course, before the ball has reached maximum pressure on the brake end 72, at which points said ball is removed from axial alignment with the pivot pin, but I find that when the brake is properly adjusted this variation is so small that it is practically negligible, and has no appreciable effect on the successful and positive action of the brake. The wear incident to the use of the brake may be readily compensated for by shifting the supporting bracket 34 circumferentially with the brake bands from time to time so that the actuating lever 64 is in the proper angular position relative to the main axle when the brake is in set position.

Among the advantages of a brake mechanism constructed as above described is the simplicity and durability of such structure, in which a minimum of moving and wearing parts are required. The power of the actuating lever 64 supported rigidly with the main axle, is applied directly to the brake band, without the interposition of crank arms, shafts or universal joints between the main axle and the wheel in the manner usually employed heretofore in devices of similar character.

A further advantage of the construction herein disclosed is the provision of a single articulated band engaging substantially the entire circumference of the brake drum, and arranged in such manner that the braking reaction is taken up at the fixed end of said band, herein comprising the bracket 34. It will be observed that this bracket is disposed closely to the free end of the band, so as to be quite close to the axis of the pivot pin 13. This arrangement is particularly advantageous, as the braking reaction is transmitted to the spindle substantially in alignment with its axis, and thus any effect such reaction may have upon the steering of the vehicle is minimized.

It will further be observed that the power of the actuating lever is applied tangentially of the brake drum, and adjustment of the single fixed or supported end of the brake band is also made tangentially in order to compensate for wear. By means of this adjustment it is not necessary to disturb the adjustment of operating levers, and associated equalizing mechanism on the vehicle, but all wear may be taken care of in each brake.

While I have illustrated and described one particular embodiment of our invention, it will be understood that I do not wish to be limited to the exact construction shown and described, but that various changes and modifications may be made without departing from the spirit and scope of my invention, as defined in the appended claims.

I claim:

1. In combination with a vehicle axle having a wheel and spindle mounted for pivotal steering movement on a substantially vertically disposed pivot pin, a brake drum carried by the wheel, a support carried by said spindle, an articulated brake member having one end thereof pivotally connected to said support on an axis extending substantially parallel with the axis of said spindle supported by the wheel spindle, and operating means for engaging said brake with said drum including a lever pivotally supported on a bearing carried by said axle and having one end thereof in operative connection with said brake and movable in a path substantially intersecting the axis of said pivot pin, and means permitting circumferential adjustment of the pivoted end of said brake member.

2. In combination with a vehicle axle having a wheel and spindle mounted for pivotal steering movement on a vertically disposed pivot pin, a brake drum carried by the wheel, a support carried by said spindle, an articulated brake member substantially surrounding said spindle within said drum and comprising a plurality of shoe members pivotally connected together, operating means for said brake including a lever pivotally supported on a bearing carried by said axle and having operative engagement with one end of said brake member at a point substantially in alignment with the axis of said pivot pin, means carried by said spindle supporting the opposite end of said brake member against braking reaction at a point adjacent the movable end of said brake member and guide means intermediate the ends of said brake member permitting circumferential braking adjustment thereof through its length.

3. In combination with a vehicle axle having a wheel and spindle mounted for pivotal steering movement on a vertically disposed pivot pin, a brake drum carried by the wheel, an articulated brake member substantially surrounding said spindle within said drum and comprising a plurality of shoe members pivotally connected together, operating means for said brake including a lever pivotally supported on a bearing carried by said axle and having operative engagement with one end of said brake member at a point substantially in alignment with the axis of said pivot pin, means carried by said spindle supporting the opposite end of said brake member against braking reaction at a point adjacent the movable end of said brake member and guide means intermediate the ends of said brake member permitting circumferential braking adjustment thereof throughout its length and means permitting circumferential adjustment of said brake supporting means.

Signed at Kenosha, Wis., this 20th day of June, 1924.

NILS ERIK WAHLBERG.